(12) United States Patent
Wang et al.

(10) Patent No.: US 10,108,663 B2
(45) Date of Patent: Oct. 23, 2018

(54) METHOD FOR OPTIMIZING AREA OF TERNARY FPRM CIRCUIT USING POPULATION MIGRATION ALGORITHM

(71) Applicant: Ningbo University, Ningbo (CN)

(72) Inventors: Pengjun Wang, Ningbo (CN); Kangping Li, Ningbo (CN); Huihong Zhang, Ningbo (CN)

(73) Assignee: NINGBO UNIVERSITY, Ningbo (CN)

( * ) Notice: Subject to any disclaimer, the term of this patent is extended or adjusted under 35 U.S.C. 154(b) by 238 days.

(21) Appl. No.: 15/252,306

(22) Filed: Aug. 31, 2016

(65) Prior Publication Data

US 2017/0060943 A1    Mar. 2, 2017

(30) Foreign Application Priority Data

Aug. 31, 2015 (CN) .......................... 2015 1 0545654

(51) Int. Cl.
*G06F 17/30* (2006.01)
*G06F 7/44* (2006.01)

(52) U.S. Cl.
CPC .......... *G06F 17/30442* (2013.01); *G06F 7/44* (2013.01)

(58) Field of Classification Search
CPC ............................. G06F 7/44; G06F 17/30442
USPC ....................................................... 707/713
See application file for complete search history.

(56) References Cited

PUBLICATIONS

Singh et al., Article: "Efficient Circuit Clustering for Area and Power Reduction in FPGAs"; ACM Transactions on Design Automation of Electronic Systems, vol. 7, No. 4, Oct. 2002, pp. 643-663. (Year: 2002).*

Nemani et al., Article: "High-Level Area and Power Estimation for VLSI Circuits". Published in: IEEE Transactions on Computer-Aided Design of Integrated Circuits and Systems (vol. 18, Issue: 6, Jun. 1999) pp. 697-713. Date of Publication: Jun. 1999. (Year: 1999).*

Kurdahi et al., Article: "PLEST: a program for area estimation of VLSI integrated circuits". Published in: Proceeding DAC '86 Proceedings of the 23rd ACM/IEEE Design Automation Conference. pp. 467-473, Las Vegas, Nevada, USA IEEE Press Piscataway, NJ, USA © 1986. ISBN:0-8186-0702-5. (Year: 1986).*

Sonntag, Article: "Area and power consumption estimations at system level with SystemQ 2.0". Published in: Simutools '09 Proceedings of the 2nd International Conference on Simulation Tools and Techniques, Article No. 25. Mar. 2-6, 2009. ICST, Brussels, Belgium, © 2009. ISBN: 978-963-9799-45-5. (Year: 2009).*

Büyük şahin et al., Article: "High-level area estimation". Published in: ISLPED '02 Proceedings of the 2002 international symposium on Low power electronics and design. pp. 271-274. Monterey, California, USA—Aug. 12-14, 2002. ACM New York, NY, USA © 2002 table of contents ISBN:1-58113-475-4. (Year: 2002)*

* cited by examiner

*Primary Examiner* — Evan Aspinwall
(74) *Attorney, Agent, or Firm* — Matthias Scholl, PC; Matthias Scholl

(57) ABSTRACT

A method for optimizing an area of a ternary FPRM circuit using population migration algorithm, the method including: 1) establishing an area estimation model of the ternary FPRM circuit; 2) establishing a corresponding relationship between the ternary FPRM circuit and population migration algorithm; 3) setting an attraction function for calculating the attraction of the population location in population migration algorithm; 4) setting relevant parameters of population migration algorithm; and 5) employing population migration algorithm to calculate and obtain the greatest attractive site and the greatest attraction.

3 Claims, No Drawings

METHOD FOR OPTIMIZING AREA OF TERNARY FPRM CIRCUIT USING POPULATION MIGRATION ALGORITHM

CROSS-REFERENCE TO RELATED APPLICATIONS

Pursuant to 35 U.S.C. § 119 and the Paris Convention Treaty, this application claims the benefit of Chinese Patent Application No. 201510545654.7 filed Aug. 31, 2015, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for optimizing an area of a ternary FPRM circuit, particularly to a method for optimizing an area of a ternary FPRM circuit using population migration algorithm.

Description of the Related Art

Any ternary (also known as three-valued) logic function can be represented by Boolean logic and Reed-Muller (RM) logic. Compared with traditional Boolean logic, communication circuits, parity checking circuits and operation circuits and the like based on RM logic have more compact structures and better testability. A RM logic function usually takes two forms of expression: fixed-polarity (Fixed-polarity Reed-Muller, FPRM) and mixed-polarity (Mixed-polarity Reed-Muller, MPRM). For a ternary FPRM logic function which has n variables, there are $3^n$ fixed polarities which correspond to $3^n$ different ternary FPRM expressions. Whether a ternary FPRM expression is simple or not is determined by its corresponding polarities. In turn, the complexity of the ternary FPRM expression directly determines the performance indices of the ternary FPRM circuit, such as area and power consumption. As a result, the polarities of a ternary FPRM circuit significantly impact the performance indices, such as area and power consumption, of the ternary FPRM circuit.

So far, a method for optimizing an area of a ternary FPRM circuit principally realizes area optimization by searching an optimal polarity. For area optimization of a small-scale ternary FPRM circuit, generally, an exhaustive method is used to traverse each polarity of a RM logic function representing the ternary FPRM circuit to search for the optimal polarity. For area optimization of a large-scale ternary FPRM circuit, search space is greatly increased due to an exponential relationship between variables and polarities, and it is quite difficult for an exhaustive method to obtain optimal results within limited time. Therefore, there is a need to find an efficient and intelligent algorithm to improve search efficiency, in order to get the optimal polarity for a ternary FPRM circuit as quickly as possible, and to achieve area optimization of the ternary FPRM circuit. Studies show that, for area optimization of a large-scale ternary FPRM circuit, a whole annealing genetic algorithm is employed to search the area-optimal polarity to obtain the smallest area of the circuit; however, there is still room for improvement in polarity search results, and it is difficult to find the optimal polarity.

Population Migration Algorithm (PMA) is a new global optimization search algorithm, proposed by Chinese scholar Zhou Yonghua, et al. according to the laws of population migration. PMA principally simulates the mechanism that people migrate along with economic center and disperse as population pressure increases. Population migration algorithm is a probabilistic search algorithm, which implements global parallel search and continuously focuses on the space that may contain the optimal solution to search for the optimal or proximate-optimal solution. Population migration algorithm is simple in principle and easy to operate, and compared with the whole annealing genetic algorithm, it significantly improves optimization effect for some functions, and has strong convergence and global optimization searching ability.

In view of this, there is provided a method for optimizing an area of a ternary FPRM circuit using population migration algorithm.

SUMMARY OF THE INVENTION

In view of the above-described problems, it is one objective of the invention to provide a method for optimizing an area of a ternary FPRM circuit using population migration algorithm. The optimization method can quickly search for the area-optimal polarity.

To achieve the above objective, in accordance with one embodiment of the invention, there is provided a method for optimizing an area of a ternary FPRM circuit using population migration algorithm. The method comprises the following steps:

1) Establishing an area estimation model of the ternary FPRM circuit:

1.1) the ternary FPRM circuit is expressed by a ternary FPRM logic function expression as follows:

$$f^p(x_{n-1}, x_{n-2}, \ldots, x_0) = \bigoplus \sum_{i=0}^{3^n-1} a_i * \prod_{j=0}^{n-1} \dot{x}_j^{i_j} \qquad (1)$$

where n is the number of variables of the function $f^p(x_{n-1}, x_{n-2}, \ldots, x_0)$, $x_{n-1}, x_{n-2}, \ldots, x_0$ denotes the n input variables of the function $f^p(x_{n-1}, x_{n-2}, \ldots, x_0)$, p denotes a polarity of the function $f^p(x_{n-1}, x_{n-2}, \ldots, x_0)$, the polarity p is expressed in ternary form as $p_{n-1} p_{n-2} \ldots p_0$, $p_j \in \{0, 1, 2\}$, $j=0, 1, 2, \ldots, n-1$, $\oplus$ represents a modulo-3 addition operation, $\Sigma$ is a summation sign, the symbol "*" represents multiplication, subscript $i=0, 1, 2, \ldots 3^n-1$, i is expressed in ternary form as $i_{n-1} i_{n-2} \ldots i_0$, $a_i$ is a coefficient of FPRM expansion, $a_i \in \{0, 1, 2\}$; $\Pi$ represents a modulo-3 multiplication operation, $$\prod_{j=0}^{n-1} \dot{x}_j^{i_j}$$

has its expansion as follow:

$$\prod_{j=0}^{n-1} \dot{x}_j^{i_j} = \dot{x}_{n-1}^{i_{n-1}} \dot{x}_{n-2}^{i_{n-2}} \ldots \dot{x}_0^{i_0},$$

where $i_j \in \{0, 1, 2\}$, $\dot{x}_j = (x_j \oplus p_j)$, $\dot{x}_j^0 = 1$, $\dot{x}_j^1 = \dot{x}_j$, $\dot{x}_j^2 = \dot{x}_j * \dot{x}_j$, polarity p and subscript i determine the representation of the variable $\dot{x}_j$;

1.2) The ternary FPRM logic function under polarity p is composed of two types of multi-input operations which are a multi-input modulo-3 addition operation and a multi-input modulo-3 multiplication operation respectively; based on expansion of a ternary FPRM logic function, the ternary FPRM logic function is decomposed into several multi-input modulo-3 addition operations and several multi-input modulo-3 multiplication operations, then each multi-input operation is individually decomposed into 2-input operations, to obtain 2-input modulo-3 addition operations and 2-input modulo-3 multiplication operations; specifically, the decomposition process is as follows:

The 1st and the 2nd input variables of a multi-input operation are taken as two input variables of a first 2-input operation, to obtain an output variable of the first 2-input operation; the output variable of the first 2-input operation and the 3rd input variable of the multi-input operation are taken as two input variables of a second 2-input operation, to obtain an output variable of the second 2-input operation; the output variable of the second 2-input operation and the 4th input variable of the multi-input operation are taken as two input variables of a third 2-input operation, to obtain an output variable of the third 2-input operation; and so forth, till all the input variables of the multi-input operation have been taken as an input variable of a 2-input operation, to accomplish the decomposition of the multi-input operation;

The ternary FPRM logic function under polarity p is decomposed into several multi-input modulo-3 addition operations (also referred to as multi-input modulo-3 addition gates) and several multi-input modulo-3 multiplication operations (also referred to as multi-input modulo-3 multiplication gates), then represent N to denote the number of the multi-input modulo-3 addition gates resulted from the decomposition of the ternary FPRM logic function under polarity p, and represent W to denote the number of the multi-input modulo-3 multiplication gates resulted from the decomposition of the ternary FPRM logic function under polarity p; each multi-input modulo-3 addition operation is decomposed into several 2-input modulo-3 addition operations (also referred to as 2-input modulo-3 addition gates), and each multi-input modulo-3 multiplication operation is decomposed into several 2-input modulo-3 multiplication operations (also referred to as 2-input modulo-3 multiplication gates); the number of the 2-input modulo-3 addition gates resulted from the decomposition of the $h^{th}$ multi-input modulo-3 addition gate is denoted as $No_{h^\bullet}$_of_Mod $3-A_p$, h=1, 2, ..., N; the number of the 2-input modulo-3 multiplication gates resulted from the decomposition of the $w^{th}$ multi-input modulo-3 multiplication gate is denoted as $No_{w^\bullet}$_of_Mod $3-M_p$, w=1, 2, ..., W;

Represent $$S = \sum_{h=1}^{N} No_{h^\bullet}\_of\_Mod3 - A_p + \sum_{w=1}^{W} No_{w^\bullet}\_of\_Mod3 - M_p$$

to be an area estimation model of the ternary FPRM circuit, where S represents the area;

$$\sum_{h=1}^{N} No_{h^\bullet}\_of\_Mod3 - A_p$$

represents the total number of 2-input modulo-3 addition gates resulted from the decomposition of the ternary FPRM logic function under polarity p;

$$\sum_{w=1}^{W} No_{w^\bullet}\_of\_Mod3 - M_p$$

represents the total number of 2-input modulo-3 multiplication gates resulted from the decomposition of the ternary FPRM logic function under polarity p;

2) Establishing a corresponding relationship between the ternary FPRM circuit and population migration algorithm:

Population migration algorithm includes the following key factors: population location, attraction of population location, the greatest attractive site, the greatest attraction, ground space of population mobility, concession region, population mobility, population migration and population disperse; the area optimization of the ternary FPRM circuit includes the following key factors: polarity, area size corresponding to polarity, optimal polarity, minimum area, optional polarity space, the zone where the optimal polarity exists, polarity jump to the zone where the optimal polarity exists and jump out of the local optimal polarity;

The population location is mapped to area optimization of the ternary FPRM circuit, and represented as polarity; the attraction of the population location is mapped to area optimization of the ternary FPRM circuit, and represented as the area size corresponding to the polarity; the greatest attractive site is mapped to area optimization of the ternary FPRM circuit, and represented as the optimal polarity; the greatest attraction is mapped to area optimization of the ternary FPRM circuit, and represented as the minimum area; the ground space of population mobility is mapped to area optimization of the ternary FPRM circuit, and represented as an optional polarity space; the concession region is mapped to area optimization of the ternary FPRM circuit, and represented as the zone where the optimal polarity exists; the population mobility is mapped to area optimization of the ternary FPRM circuit, and represented as polarity transition; the population migration is mapped to area optimization of the ternary FPRM circuit, and represented as polarity jump to the zone where the optimal polarity exists; the population disperse is mapped to area optimization of the ternary FPRM circuit, and represented as polarity jump out of the local optimal polarity;

3) Setting an attraction function for calculating the attraction of the population location in population migration algorithm:

According to the area estimation model, an attraction function for calculating the attraction of the population location in population migration algorithm is set as follows: in population migration algorithm, greater attraction indicates higher economic level of the population location, whereas the area-optimal polarity requires the area to be as small as possible, and therefore, in order to combine both conditions, the reciprocal of the area is employed to represent the attraction, and the attraction function is obtained as follows:

$$\text{attraction} = (1/S) * \alpha = \left( 1 / \left( \sum_{h=1}^{N} \text{No}_h\text{\textbullet\_of\_Mod3} - A_p + \sum_{w=1}^{W} \text{No}_w\text{\textbullet\_of\_Mod3} - M_p \right) \right) * \alpha \quad (2)$$

where the symbol "/" denotes a division operation, and attraction represents attraction value, greater attraction value indicates better area optimization effect of the circuit; α is a magnification coefficient, its value is equal to a natural number greater than 1000;

4) Setting relevant parameters of population migration algorithm:

Population migration algorithm has five parameters to be set: population scale s, the number of population mobility times l, population pressure parameter q, shrinkage factor c, and the number of population disperse times z;

Represent the population scale s be equal to the number of input variables of the ternary FPRM logic function, i.e., s=n; the number of population mobility times l is the radius of the region where the population exists, and the radius where the population exists is denoted as $\Delta t$, $l=\Delta t$, $\Delta t=3^s/s^2$; the population pressure parameter q is $\Delta t/10$; the shrinkage factor c=0.3; when the ternary FPRM circuit is a small-scale circuit, the number of population disperse times z=15, and when the ternary FPRM circuit is a large-scale circuit, the number of population disperse times z=2;

5) Employing population migration algorithm to calculate and obtain the greatest attractive site and the greatest attraction, wherein the greatest attractive site is the optimal polarity of the ternary FPRM circuit, and the greatest attraction is the minimum area of the ternary FPRM circuit.

In a class of this embodiment, in the step 5), the calculation process of population migration algorithm is as follows:

51) In the ground space of population mobility, a random function rand( ) is employed to generate population locations in number S, and the population locations in number S are denoted as P1, P2, . . . , Ps, then the P1, P2, . . . , Ps are taken as center points respectively, so that the regions in number S where the population exists are determined, according to the radiuses of the regions where the population exists;

52) The attraction function is used to calculate the attraction of the population location Pv, v=1, 2, 3, . . . , s, to obtain the attraction of the population locations P1, P2, . . . , Ps;

53) By comparing the attraction of the population locations P1, P2, . . . , Ps, the population location with the greatest attraction is selected as the greatest attractive site, then the greatest attractive site and the greatest attraction are recorded;

54) Population mobility is performed: In the population region corresponding to the population location Pv, a random function is employed to randomly generate a population location P'v, to obtain P'1, P'2, . . . , P's, then P'1, P'2, . . . , P's is used to update the population locations P1, P2, . . . , Ps, namely P1=P'1, P2=P'2, . . . , Ps=P's, where P'v=2*$\Delta t$*rand ( )+(Pv-$\Delta t$), the symbol "*" denotes multiplication operation, $\Delta t$ denotes the radius of the population region; rand( ) is the random function;

55) The updated population locations P1, P2, . . . , Ps in the step 5)-4 are processed by following the steps 52)-53), to obtain the updated greatest attractive site and the updated greatest attraction;

56) Population migration is performed: the updated greatest attractive site in step 55) is taken as the center point, so that the concession region is determined according to the radius $\Delta t$ of the population region, then a random function rand( ) employed to generate population locations in number S in the concession region, so that the obtained population locations in number S are used to again update the population locations P1, P2, . . . , Ps;

57) The updated population locations P1, P2, . . . , Ps in the step 56) are processed by following the steps 52)-53), to obtain the again updated greatest attractive site and the again updated greatest attraction;

58) Shrinkage of the concession region is performed: Represent $\Delta t'=(1-c)*\Delta t$ and employ $\Delta t'$ to update $\Delta t$, the steps 56)-57) are repeated until $\Delta t<q$;

59) After the concession region is shrunk to a certain extent that $\Delta t<q$, population disperse is performed: the steps 51)-58) are repeated, until the number of population disperse times z is met, and so the algorithm ends, to obtain the last updated greatest attractive site and the last updated greatest attraction;

510) The last updated greatest attractive site and the last updated greatest attraction are output, wherein the greatest attractive site is the optimal polarity of the ternary FPRM circuit, and the greatest attraction is the minimum area of the ternary FPRM circuit.

In a class of this embodiment, in the step 1), a ternary-FPRM-polarity transform technology is employed to obtain the ternary FPRM logic function, and the specific process is as follows:

A) The required polarity of the ternary FPRM circuit is denoted as p, and p is expressed in ternary form as $p=p_{n-1} p_{n-2} \cdots p_0$, where n represents the number of the input variables;

B) For $p_j$, its corresponding fixed-polarity GF transformation matrix $G_3^{<p_j; P>}$ is generated; where, $p_j \in \{p_{n-1}, p_{n-2}, \ldots, p_0\}, j \in \{n-1, n-2, \ldots, 0\}$; when $p_j = 0$, $G_3^{\langle p_j \rangle} = G_3$; when $p_j = 1$, $G_3^{\langle p_j \rangle} = G_3^{(1)}$; when $p_j = 2$, $$G_3^{\langle p_j \rangle} = G_3^{(2)}; G_3 = \begin{bmatrix} 1 & 0 & 0 \\ 0 & 2 & 1 \\ 2 & 2 & 2 \end{bmatrix}, G_3^{(1)} = \begin{bmatrix} 0 & 0 & 1 \\ 2 & 1 & 0 \\ 2 & 2 & 2 \end{bmatrix},$$

$$G_3^{(2)} = \begin{bmatrix} 0 & 1 & 0 \\ 1 & 0 & 2 \\ 2 & 2 & 2 \end{bmatrix};$$

C) The minterm M is expressed in ternary form as a sequence $M=M_{n-1} M_{n-2} \ldots M_0$, $M_j \in \{0, 1, 2\}$, and its corresponding function value is denoted as $f(M)$;

D) According to the formula (3), for each minterm, a new term $\pi_j$ is generated, $\pi_j \in \{0, 1, 2\}$; according to the formula (4), the contribution of the new item to the FPRM coefficients is calculated, and the contribution value is denoted as $v(\pi)$;

$$\pi_j = \{t | G_3^{<p_j>}[t, M_j] \neq 0\}, t \in \{0,1,2\} \quad (3)$$

$$v(\pi) = (v_{n-1} \cdot v_{n-2} \ldots v_0) \cdot f(M) \quad (4)$$

where $\pi = \pi_{n-1} \pi_{n-2} \ldots \pi_0$, $v_j = G_3^{<p_j>}[\pi_j, M_j]$.

E) An index table is employed to record the generated new term and the contribution value of each new tem, if the generated new term already exists, then the contribution values of the identical new items are superimposed and presented as the contribution value of that new item;

F) The steps 3)-4) are repeated for all the minterms, and the contribution values corresponding to respective new terms are the FPRM expansion coefficients;

G) According to the FPRM expansion coefficients, the ternary FPRM logic function expression under polarity p is obtained.

Advantages of the method for optimizing the area of the ternary FPRM circuit using population migration algorithm according to embodiments of the invention are summarized as follows:

First, an area estimation model of a ternary FPRM circuit is established, next, a corresponding relationship between the ternary FPRM circuit and population migration algorithm is established, then, according to the area estimation model of the ternary FPRM circuit, an attraction function for calculating the attraction of the population location in population migration algorithm is set, thereafter, based on the ternary FPRM logic function expansion corresponding to the ternary FPRM circuit and the setting of relevant parameters of population migration algorithm, the greatest attractive site and the greatest attraction are calculated by using population migration algorithm, wherein the greatest attractive site is the optimal polarity of the ternary FPRM circuit, and the greatest attraction is the minimum area of the ternary FPRM circuit, to obtain the results of area optimization of the ternary FPRM circuit by using population migration algorithm, such area optimization method can quickly search for area-optimal polarity, with high search efficiency and significant area optimization effect. Through simulation and verification of the method of the present invention and whole annealing genetic algorithm on 10 testing circuits respectively, the method of the present invention leads to average area-saving of 10.04% and average time-saving of 56.59% with respect to the whole annealing genetic algorithm.

DETAILED DESCRIPTION OF THE EMBODIMENTS

For further illustrating the invention, experiments detailing a method for optimizing an area of a ternary FPRM circuit using population migration algorithm are described below. It should be noted that the following examples are intended to describe and not to limit the invention.

Example 1

A method for optimizing an area of a ternary FPRM circuit using population migration algorithm, comprises the following steps:

1) Establishing an area estimation model of the ternary FPRM circuit:

11) The ternary FPRM circuit is expressed by a ternary FPRM logic function expression as follows:

$$f^p(x_{n-1}, x_{n-2}, \ldots, x_0) = \bigoplus \sum_{i=0}^{3^n-1} a_i * \prod_{j=0}^{n-1} \dot{x}_j^{i_j} \quad (1)$$

where n is the number of variables of the function $f^p(x_{n-1}, x_{n-2}, \ldots, x_0)$, $x_{n-1}, x_{n-2}, \ldots, x_0$ denotes the n input variables of the function $f^p(x_{n-1}, x_{n-2}, \ldots, x_0)$, p denotes a polarity of the function $f^p(x_{n-1}, x_{n-2}, \ldots, x_0)$, the polarity p is expressed in ternary form as $p_{n-1} p_{n-2} \cdots p_0$, $p_j \in \{0, 1, 2\}$, j=0, 1, 2, ..., n-1, $\oplus$ represents a modulo-3 addition operation, $\Sigma$ is a summation sign, the symbol "*" represents multiplication, subscript i=0, 1, 2, ..., $3^n-1$, i is expressed in ternary form as $i_{n-1} i_{n-2} \cdots i_0$, $a_i$ is a coefficient of FPRM expansion, $a_i \in \{0, 1, 2\}$; $\Pi$ represents a modulo-3 multiplication operation, $$\prod_{j=0}^{n-1} \dot{x}_j^{i_j}$$

has its expansion as follow:

$$\prod_{j=0}^{n-1} \dot{x}_j^{i_j} = \dot{x}_{n-1}^{i_{n-1}} \dot{x}_{n-2}^{i_{n-2}} \cdots \dot{x}_0^{i_0},$$

where $i_j \in \{0, 1, 2\}$, $\dot{x}_j = (x_j \oplus p_j)$, $\dot{x}_j^0 = 1$, $\dot{x}_j^1 = \dot{x}_j$, $\dot{x}_j^2 = \dot{x}_j * \dot{x}_j$, polarity p and subscript i determine the representation of the variable $\dot{x}_j$;

12) The ternary FPRM logic function under polarity p is composed of two types of multi-input operations which are a multi-input modulo-3 addition operation and a multi-input modulo-3 multiplication operation respectively; based on expansion of a ternary FPRM logic function, the ternary FPRM logic function is decomposed into several multi-input modulo-3 addition operations and several multi-input modulo-3 multiplication operations, then each multi-input operation is individually decomposed into 2-input operations, to obtain 2-input modulo-3 addition operations and 2-input modulo-3 multiplication operations; specifically, the decomposition process is as follows:

The $1^{st}$ and the $2^{nd}$ input variables of a multi-input operation are taken as two input variables of a first 2-input operation, to obtain an output variable of the first 2-input operation; the output variable of the first 2-input operation and the $3^{rd}$ input variable of the multi-input operation are taken as two input variables of a second 2-input operation, to obtain an output variable of the second 2-input operation; the output variable of the second 2-input operation and the $4^{th}$ input variable of the multi-input operation are taken as two input variables of a third 2-input operation, to obtain an output variable of the third 2-input operation; and so forth, till all the input variables of the multi-input operation have been taken as an input variable of a 2-input operation, thereby accomplishing the decomposition of the multi-input operation;

The ternary FPRM logic function under polarity p is decomposed into several multi-input modulo-3 addition operations (also referred to as multi-input modulo-3 addition gates) and several multi-input modulo-3 multiplication operations (also referred to as multi-input modulo-3 multiplication gates), then represent N to denote the number of the multi-input modulo-3 addition gates resulted from the decomposition of the ternary FPRM logic function under polarity p, and represent W to denote the number of the multi-input modulo-3 multiplication gates resulted from the decomposition of the ternary FPRM logic function under polarity p; each multi-input modulo-3 addition operation is decomposed into several 2-input modulo-3 addition operations (also referred to as 2-input modulo-3 addition gates), and each multi-input modulo-3 multiplication operation is decomposed into several 2-input modulo-3 multiplication operations (also referred to as 2-input modulo-3 multiplication gates); the number of the 2-input modulo-3 addition gates resulted from the decomposition of the $h^{th}$ multi-input modulo-3 addition gate is denoted as $No_h\cdot\_of\_Mod\ 3-A_p$, h=1, 2, ..., N; the number of the 2-input modulo-3 multiplication gates resulted from the decomposition of the $w^{th}$ multi-input modulo-3 multiplication gate is denoted as $No_w\cdot\_of\_Mod\ 3-M_p$, w=1, 2, ..., W;

Represent $$S = \sum_{h=1}^{N} No_h\cdot\_of\_Mod3 - A_p + \sum_{w=1}^{W} No_w\cdot\_of\_Mod3 - M_p$$

be an area estimation model of the ternary FPRM circuit, where S represents the area;

$$\sum_{h=1}^{N} No_h\cdot\_of\_Mod3 - A_p$$

represents the total number of 2-input modulo-3 addition gates resulted from the decomposition of the ternary FPRM logic function under polarity p;

$$\sum_{w=1}^{W} No_w\cdot\_of\_Mod3 - M_p$$

represents the total number of 2-input modulo-3 multiplication gates resulted from the decomposition of the ternary FPRM logic function under polarity p;

2) Establishing a corresponding relationship between the ternary FPRM circuit and population migration algorithm:

Population migration algorithm includes the following key factors: population location, attraction of population location, the greatest attractive site, the greatest attraction, ground space of population mobility, concession region, population mobility, population migration and population disperse; the area optimization of the ternary FPRM circuit includes the following key factors: polarity, area size corresponding to polarity, optimal polarity, minimum area, optional polarity space, the zone where the optimal polarity exists, polarity jump to the zone where the optimal polarity exists and jump out of the local optimal polarity;

The population location is mapped to area optimization of the ternary FPRM circuit, and represented as polarity; the attraction of the population location is mapped to area optimization of the ternary FPRM circuit, and represented as the area size corresponding to the polarity; the greatest attractive site is mapped to area optimization of the ternary FPRM circuit, and represented as the optimal polarity; the greatest attraction is mapped to area optimization of the ternary FPRM circuit, and represented as the minimum area; the ground space of population mobility is mapped to area optimization of the ternary FPRM circuit, and represented as an optional polarity space; the concession region is mapped to area optimization of the ternary FPRM circuit, and represented as the zone where the optimal polarity exists; the population mobility is mapped to area optimization of the ternary FPRM circuit, and represented as polarity transition; the population migration is mapped to area optimization of the ternary FPRM circuit, and represented as polarity jump to the zone where the optimal polarity exists; the population disperse is mapped to area optimization of the ternary FPRM circuit, and represented as polarity jump out of the local optimal polarity;

3) Setting an attraction function for calculating the attraction of the population location in population migration algorithm:

According to the area estimation model, an attraction function for calculating the attraction of the population location in population migration algorithm is set as follows: in population migration algorithm, greater attraction indicates higher economic level of the population location, whereas the area-optimal polarity requires the area to be as small as possible, and therefore, in order to combine both conditions, the reciprocal of the area is employed to represent the attraction, and the attraction function is obtained as follows:

$$\text{attraction} = (1/S) * \alpha = \left(1 / \left(\sum_{h=1}^{N} No_h\cdot\_of\_Mod3 - A_p + \sum_{w=1}^{W} No_w\cdot\_of\_Mod3 - M_p\right)\right) * \alpha \qquad (2)$$

where the symbol "/" denotes a division operation, and attraction represents attraction value, greater attraction value indicates better area optimization effect of the circuit; $\alpha$ is a magnification coefficient, its value is equal to a natural number greater than 1000;

4) Setting relevant parameters of population migration algorithm:

Population migration algorithm has five parameters to be set: population scale s, the number of population mobility times l, population pressure parameter q, shrinkage factor c, and the number of population disperse times z;

Represent the population scale s be equal to the number of input variables of the ternary FPRM logic function, i.e., s=n; the number of population mobility times l is the radius of the region where the population exists, and the radius where the population exists is denoted as $\Delta t$, $l=\Delta t$, $\Delta t=3^s/s^2$; the population pressure parameter q is $\Delta t/10$; the shrinkage factor c=0.3; when the ternary FPRM circuit is a small-scale circuit, the number of population disperse times z=15, and when the ternary FPRM circuit is a large-scale circuit, the number of population disperse times z=2; a large-scale circuit usually refers to a circuit having 4 or more input variables, and a small-scale circuit usually refers to a circuit having 4 or less input variables;

5) Employing population migration algorithm to calculate and obtain the greatest attractive site and the greatest attraction, wherein the greatest attractive site is the optimal polarity of the ternary FPRM circuit, and the greatest attraction is the minimum area of the ternary FPRM circuit.

In this embodiment, an existing mature ternary-FPRM-polarity transform technology is employed to obtain expansion of the ternary FPRM logic function, and population migration algorithm also utilizes an existing mature technology.

Example 2

A method for optimizing an area of a ternary FPRM circuit using population migration algorithm, comprises the following steps:

1) Establishing an area estimation model of the ternary FPRM circuit:

11) The ternary FPRM circuit is expressed by a ternary FPRM logic function expression as follows:

$$f^p(x_{n-1}, x_{n-2}, \ldots, x_0) = \bigoplus \sum_{i=0}^{3^n-1} a_i * \prod_{j=0}^{n-1} \dot{x}_j^{i_j} \quad (1)$$

where n is the number of variables of the function $f^p(x_{n-1}, x_{n-2}, \ldots, x_0)$, $x_{n-1}, x_{n-2}, \ldots, x_0$ denotes the n input variables of the function $f^p(x_{n-1}, x_{n-2}, \ldots, x_0)$, p denotes a polarity of the function $f^p(x_{n-1}, x_{n-2}, \ldots, x_0)$, the polarity p is expressed in ternary form as $p_{n-1} p_{n-2} \ldots p_0$, $p_j \in \{0, 1, 2\}$, j=0, 1, 2, ..., n-1, $\oplus$ represents a modulo-3 addition operation, $\Sigma$ is a summation sign, the symbol "*" represents multiplication, subscript i=0, 1, 2, ..., $3^n-1$, i is expressed in ternary form as $i_{n-1} i_{n-2} \ldots i_0$, $a_i$ is a coefficient of FPRM expansion, $a_i \in \{0, 1, 2\}$; $\Pi$ represents a modulo-3 multiplication operation, $$\prod_{j=0}^{n-1} \dot{x}_j^{i_j}$$

has its expansion as follow:

$$\prod_{j=0}^{n-1} \dot{x}_j^{i_j} = \dot{x}_{n-1}^{i_{n-1}} \dot{x}_{n-2}^{i_{n-2}} \ldots \dot{x}_0^{i_0},$$

where $i_j \in \{0, 1, 2\}$, $\dot{x}_j = (x_j \oplus p_j)$, $\dot{x}_j^0 = 1$, $\dot{x}_j^1 = \dot{x}_j$, $\dot{x}_j^2 = \dot{x}_j * \dot{x}_j$, polarity p and subscript i determine the representation of the variable $\dot{x}_j$;

12) The ternary FPRM logic function under polarity p is composed of two types of multi-input operations which are a multi-input modulo-3 addition operation and a multi-input modulo-3 multiplication operation respectively; based on expansion of a ternary FPRM logic function, the ternary FPRM logic function is decomposed into several multi-input modulo-3 addition operations and several multi-input modulo-3 multiplication operations, then each multi-input operation is individually decomposed into 2-input operations, to obtain 2-input modulo-3 addition operations and 2-input modulo-3 multiplication operations; specifically, the decomposition process is as follows:

The $1^{st}$ and the $2^{nd}$ input variables of a multi-input operation are taken as two input variables of a first 2-input operation, to obtain an output variable of the first 2-input operation; the output variable of the first 2-input operation and the $3^{rd}$ input variable of the multi-input operation are taken as two input variables of a second 2-input operation, to obtain an output variable of the second 2-input operation; the output variable of the second 2-input operation and the $4^{th}$ input variable of the multi-input operation are taken as two input variables of a third 2-input operation, to obtain an output variable of the third 2-input operation; and so forth, till all the input variables of the multi-input operation have been taken as an input variable of a 2-input operation, thereby accomplishing the decomposition of the multi-input operation;

The ternary FPRM logic function under polarity p is decomposed into several multi-input modulo-3 addition operations (also referred to as multi-input modulo-3 addition gates) and several multi-input modulo-3 multiplication operations (also referred to as multi-input modulo-3 multiplication gates), then represent N to denote the number of the multi-input modulo-3 addition gates resulted from the decomposition of the ternary FPRM logic function under polarity p, and represent W to denote the number of the multi-input modulo-3 multiplication gates resulted from the decomposition of the ternary FPRM logic function under polarity p; each multi-input modulo-3 addition operation is decomposed into several 2-input modulo-3 addition operations (also referred to as 2-input modulo-3 addition gates), and each multi-input modulo-3 multiplication operation is decomposed into several 2-input modulo-3 multiplication operations (also referred to as 2-input modulo-3 multiplication gates); the number of the 2-input modulo-3 addition gates resulted from the decomposition of the $h^{th}$ multi-input modulo-3 addition gate is denoted as $No_h._of\_Mod\ 3-A_p$, h=1, 2, ..., N; the number of the 2-input modulo-3 multiplication gates resulted from the decomposition of the $w^{th}$ multi-input modulo-3 multiplication gate is denoted as $No_w._of\_Mod\ 3-M_p$, w=1, 2, ..., W;

Represent $$S = \sum_{h=1}^{N} No_h._of\_Mod3 - A_p + \sum_{w=1}^{W} No_w._of\_Mod3 - M_p$$

be an area estimation model of the ternary FPRM circuit, where S represents the area;

$$\sum_{h=1}^{N} No_h._of\_Mod3 - A_p$$

represents the total number of 2-input modulo-3 addition gates resulted from the decomposition of the ternary FPRM logic function under polarity p;

$$\sum_{w=1}^{W} No_w._of\_Mod3 - M_p$$

represents the total number of 2-input modulo-3 multiplication gates resulted from the decomposition of the ternary FPRM logic function under polarity p;

2) Establishing a corresponding relationship between the ternary FPRM circuit and population migration algorithm:

Population migration algorithm includes the following key factors: population location, attraction of population location, the greatest attractive site, the greatest attraction, ground space of population mobility, concession region, population mobility, population migration and population disperse; the area optimization of the ternary FPRM circuit includes the following key factors: polarity, area size corresponding to polarity, optimal polarity, minimum area, optional polarity space, the zone where the optimal polarity exists, polarity jump to the zone where the optimal polarity exists and jump out of the local optimal polarity;

The population location is mapped to area optimization of the ternary FPRM circuit, and represented as polarity; the attraction of the population location is mapped to area optimization of the ternary FPRM circuit, and represented as the area size corresponding to the polarity; the greatest attractive site is mapped to area optimization of the ternary FPRM circuit, and represented as the optimal polarity; the greatest attraction is mapped to area optimization of the ternary FPRM circuit, and represented as the minimum area; the ground space of population mobility is mapped to area optimization of the ternary FPRM circuit, and represented as an optional polarity space; the concession region is mapped to area optimization of the ternary FPRM circuit, and represented as the zone where the optimal polarity exists; the population mobility is mapped to area optimization of the ternary FPRM circuit, and represented as polarity transition; the population migration is mapped to area optimization of the ternary FPRM circuit, and represented as polarity jump to the zone where the optimal polarity exists; the population disperse is mapped to area optimization of the ternary FPRM circuit, and represented as polarity jump out of the local optimal polarity;

3) Setting an attraction function for calculating the attraction of the population location in population migration algorithm:

According to the area estimation model, an attraction function for calculating the attraction of the population location in population migration algorithm is set as follows: in population migration algorithm, greater attraction indicates higher economic level of the population location, whereas the area-optimal polarity requires the area to be as small as possible, and therefore, in order to combine both conditions, the reciprocal of the area is employed to represent the attraction, and the attraction function is obtained as follows:

$$\text{attraction} = (1/S) * \alpha = \left(1 \Big/ \left(\sum_{h=1}^{N} \text{No}_{h^*}\_\text{of}\_\text{Mod3} - A_p + \sum_{w=1}^{W} \text{No}_{w^*}\_\text{of}\_\text{Mod3} - M_p\right)\right) * \alpha \quad (2)$$

where the symbol "/" denotes a division operation, and attraction represents attraction value, greater attraction value indicates better area optimization effect of the circuit; $\alpha$ is a magnification coefficient, its value is equal to a natural number greater than 1000;

4) Setting relevant parameters of population migration algorithm:

Population migration algorithm has five parameters to be set: population scale s, the number of population mobility times l, population pressure parameter q, shrinkage factor c, and the number of population disperse times z;

Represent the population scale s be equal to the number of input variables of the ternary FPRM logic function, i.e., s=n; the number of population mobility times l is the radius of the region where the population exists, and the radius where the population exists is denoted as $\Delta t$, $l=\Delta t$, $\Delta t=3^s/s^2$; the population pressure parameter q is $\Delta t/10$; the shrinkage factor c=0.3; when the ternary FPRM circuit is a small-scale circuit, the number of population disperse times z=15, and when the ternary FPRM circuit is a large-scale circuit, the number of population disperse times z=2; a large-scale circuit usually refers to a circuit having 4 or more input variables, and a small-scale circuit usually refers to a circuit having 4 or less input variables;

5) Employing population migration algorithm to calculate and obtain the greatest attractive site and the greatest attraction, wherein the greatest attractive site is the optimal polarity of the ternary FPRM circuit, and the greatest attraction is the minimum area of the ternary FPRM circuit.

In this embodiment, in the step 5), the calculation process of population migration algorithm is as follows:

51) In the ground space of population mobility, a random function rand( ) is employed to generate population locations in number S, and the population locations in number S are denoted as $P1, P2, \ldots, Ps$, then the $P1, P2, \ldots, Ps$ are taken as center points respectively, so that the regions in number S where the population exists are determined, according to the radiuses of the regions where the population exists;

52) The attraction function is used to calculate the attraction of the population location Pv, v=1, 2, 3, ..., s, to obtain the attraction of the population locations $P1, P2, \ldots, Ps$;

53) By comparing the attraction of the population locations $P1, P2, \ldots, Ps$, the population location with the greatest attraction is selected as the greatest attractive site, then the greatest attractive site and the greatest attraction are recorded;

54) Population mobility is performed: In the population region corresponding to the population location Pv, a random function is employed to randomly generate a population location P'v, to obtain $P'1, P'2, \ldots, P's$, then $P'1, P'2, \ldots, P's$ is used to update the population locations $P1, P2, \ldots, Ps$, namely $P1=P'1, P2=2, \ldots, Ps=P's$, where $P'v=2*\Delta t*rand( )+(Pv-\Delta t)$, the symbol "*" denotes multiplication operation, $\Delta t$ denotes the radius of the population region; rand( ) the random function;

55) The updated population locations $P1, P2, \ldots, Ps$ in the step 54) are processed by following the steps 52)-53), to obtain the updated greatest attractive site and the updated greatest attraction;

56) Population migration is performed: the updated greatest attractive site in step 55) is taken as the center point, so that the concession region is determined according to the radius $\Delta t$ of the population region, then a random function rand( ) is employed to generate population locations in number S in the concession region, so that the obtained population locations in number S are used to again update the population locations $P1, P2, \ldots, Ps$;

57) The updated population locations $P1, P2, \ldots, Ps$ in the step 56) are processed by following the steps 52)-53), to obtain the again updated greatest attractive site and the again updated greatest attraction;

58) Shrinkage of the concession region is performed: Represent $\Delta t'=(1-c)*\Delta t$ and employ $\Delta t'$ to update $\Delta t$, the steps 56)-57) are repeated until $\Delta t<q$;

59) After the concession region is shrunk to a certain extent that $\Delta t<q$, population disperse is performed: the steps 51)-58) are repeated, until the number of population disperse times z is met, and so the algorithm ends, to obtain the last updated greatest attractive site and the last updated greatest attraction;

510) The last updated greatest attractive site and the last updated greatest attraction are output, wherein the greatest attractive site is the optimal polarity of the ternary FPRM circuit, and the greatest attraction is the minimum area of the ternary FPRM circuit.

In this embodiment, in the step 1), a ternary-FPRM-polarity transform technology is employed to obtain the ternary FPRM logic function, and the specific process is as follows:

1) The required polarity of the ternary FPRM circuit is denoted as p, and p is expressed in ternary form as $p=p_{n-1} p_{n-2} \ldots p_0$, where n represents the number of the input variables;

2) For $p_j$, its corresponding fixed-polarity GF transformation matrix $G_3^{\langle p_j \rangle}$ is generated; where, $$p_j \in \{p_{n-1}, p_{n-2}, \ldots, p_0\}, j \in \{n-1, n-2, \ldots, 0\}; \text{ when } p_j = 0,$$

$$G_3^{\langle p_j \rangle} = G_3; \text{ when } p_j = 1, G_3^{\langle p_j \rangle} = G_3^{(1)}; \text{ when } p_j = 2, G_3^{\langle p_j \rangle} = G_3^{(2)};$$

$$G_3 = \begin{bmatrix} 1 & 0 & 0 \\ 0 & 2 & 1 \\ 2 & 2 & 2 \end{bmatrix}, G_3^{(1)} = \begin{bmatrix} 0 & 0 & 1 \\ 2 & 1 & 0 \\ 2 & 2 & 2 \end{bmatrix}, G_3^{(2)} = \begin{bmatrix} 0 & 1 & 0 \\ 1 & 0 & 2 \\ 2 & 2 & 2 \end{bmatrix};$$

3) The minterm M is expressed in ternary form as a sequence $M=M_{n-1} M_{n-2} \ldots M_0$, $M_j \in \{0, 1, 2\}$, and its corresponding function value is denoted as $f(M)$;

to their optimization results, through simulation and verification on 10 MCNC Benchmark circuits in Windows 7 64-bit operating system, under the operating environment of Intel® Core™ i3-2130 CPU 3.40 GHZ, 4G RAM, with implementation of C programs compiled with VC6.0.

The search results for the area-optimal polarity of the ternary FPRM circuit are shown in Table 1. in Table 1, column 1 shows the names of the circuits; column 2 indicates the number of input variables of the ternary circuits, respectively; column 3, column 4, column 5 and column 6 indicate the searched optimal polarity, the number of modulo-3 addition operations, the number of modulo-3 multiplication operations and the running time of whole annealing genetic algorithm in order, respectively; column 7, column 8, column 9 and column 10 indicate the searched optimal polarity, the number of modulo-3 addition operations, the number of modulo-3 multiplication operations and the algorithm running time of the method of the present invention in order, respectively.

TABLE 1

Search result for area-optimal polarity of ternary FPRM circuit

| | | Whole Annealing Genetic Algorithm | | | | The method of the present invention | | | |
|---|---|---|---|---|---|---|---|---|---|
| Circuit name | Number of input variables | Polarity | Number of modulo-3 addition operations | Number of modulo-3 multiplication operations | Time (s) | Polarity | Number of modulo-3 addition operations | Number of modulo-3 multiplication operations | Time (s) |
| Sqn | 4 | 5 | 33 | 135 | 4.89 | 53 | 27 | 118 | 1.66 |
| Z5xp1 | 4 | 50 | 26 | 119 | 5.06 | 71 | 23 | 110 | 3.38 |
| Con1 | 4 | 23 | 10 | 49 | 5.65 | 77 | 9 | 47 | 2.21 |
| Misex1 | 4 | 43 | 14 | 64 | 6.2 | 70 | 15 | 60 | 4.05 |
| Tms | 4 | 80 | 32 | 146 | 7.2 | 35 | 22 | 107 | 3.54 |
| Sex | 5 | 158 | 34 | 160 | 14.23 | 155 | 30 | 159 | 5.85 |
| Apla | 5 | 242 | 19 | 136 | 17 | 74 | 19 | 120 | 0.5 |
| Br1 | 6 | 26 | 15 | 104 | 32.35 | 467 | 15 | 96 | 1.21 |
| T4 | 6 | 385 | 9 | 54 | 33.28 | 397 | 8 | 47 | 29.68 |
| Table3 | 7 | 850 | 737 | 5465 | 1191.3 | 1345 | 644 | 4960 | 509.64 |

4) According to the formula (3), for each minterm, a new term $\pi_j$ is generated, $\pi_j \in \{0, 1, 2\}$; According to the formula (4), the contribution of the new item to the FPRM coefficients is calculated, and the contribution value is denoted as $v(\pi)$;

$$\pi_j = \{t | G_3^{\langle p_j \rangle}[t, M_j] \neq 0\}, t \in \{0, 1, 2\} \quad (3)$$

$$v(\pi) = (v_{n-1} v_{n-2} \ldots v_0) \cdot f(M) \quad (4)$$

where $\pi = \pi_{n-1} \pi_{n-2} \ldots \pi_0$, $v_j = G_3^{\langle p_j \rangle}[\pi_j, M_j]$.

5) An index table is employed to record the generated new term and the contribution value of each new tem, if the generated new term already exists, then the contribution values of the identical new items are superimposed and presented as the contribution value of that new item;

6) The steps 3)-4) are repeated for all the minterms, and the contribution values corresponding to respective new terms are the FPRM expansion coefficients;

7) According to the FPRM expansion coefficients, the ternary FPRM logic function expression is obtained.

The area optimization method of the present invention is compared with whole annealing genetic algorithm in regard Compared with whole annealing genetic algorithm, the area-saving and time-saving (in percentage) achieved by the optimization method of the present invention are as shown in Table 2. The percentages of area-saving and time-saving are defined respectively as follows:

$$Save_{Area} \% = \frac{Area_{WAGA} - Area_{PMA}}{Area_{WAGA}} \times 100\% \quad (5)$$

$$Save_{Time} \% = \frac{Time_{WAGA} - Time_{PMA}}{Time_{WAGA}} \times 100\% \quad (6)$$

where, $Save_{Area}$ represents the area-saving, $Save_{Time}$ represents the time-saving in running the algorithm; $Area_{WAGA}$ represents the optimized area achieved by whole annealing genetic algorithm, $Time_{WAGA}$ represents the optimization time of whole annealing genetic algorithm; $Area_{PMA}$ represents the optimized area achieved by the method of the present invention, $Time_{PMA}$ represents the optimization time of the optimization method of the present invention.

TABLE 2

Percentages of area-saving and time-saving in area optimization of ternary FPRM circuit

| Circuit name | Number of input variables | Area | | Savings % (in percentage) | |
|---|---|---|---|---|---|
| | | Whole Annealing Genetic Algorithm | The method of the present invention. | Area-saving | Time-saving |
| Sqn | 4 | 168 | 145 | 13.69 | 66.05 |
| Z5xp1 | 4 | 145 | 133 | 8.28 | 33.20 |
| Con1 | 4 | 59 | 56 | 5.08 | 60.88 |
| Misex1 | 4 | 78 | 75 | 3.85 | 34.68 |
| Tms | 4 | 178 | 129 | 27.53 | 50.83 |
| Sex | 5 | 194 | 189 | 2.58 | 58.89 |
| Apla | 5 | 155 | 139 | 10.32 | 97.06 |
| Br1 | 6 | 119 | 111 | 6.72 | 96.26 |
| T4 | 6 | 63 | 55 | 12.70 | 10.82 |
| Table3 | 7 | 6202 | 5604 | 9.64 | 57.22 |
| Average savings % | | | | 10.04 | 56.59 |

As inferred from analysis of data in Table 2, the area optimization method of the present invention has an obvious effect of optimization. Compared with whole annealing genetic algorithm, the method of the present invention leads to average area-saving of 10.04% and average time-saving of 56.59% on 10 testing circuits.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for optimizing an area of a ternary FPRM circuit using population migration algorithm, the method comprising:

1) establishing an area estimation model of the ternary FPRM circuit, wherein 1.1) the ternary FPRM circuit is expressed by a ternary FPRM logic function expression as follows:

$$f^p(x_{n-1}, x_{n-2}, \ldots, x_0) = \bigoplus_{i=0}^{3^n-1} a_i * \prod_{j=0}^{n-1} \dot{x}_j^{i_j} \quad (1)$$

where n is the number of variables of the function $f^p(x_{n-1}, x_{n-2}, \ldots, x_0)$, $x_{n-1}, x_{n-2}, \ldots, x_0$ denotes the n input variables of the function $f^p(x_{n-1}, x_{n-2}, \ldots, x_0)$, p denotes a polarity of the function $f^p(x_{n-1}, x_{n-2}, \ldots, x_0)$, the polarity p is expressed in ternary form as $p_{n-1} p_{n-2} \ldots p_0$, $p_j \in \{0, 1, 2\}$, $j=0, 1, 2, \ldots, n-1$, $\oplus$ represents a modulo-3 addition operation, $\Sigma$ is a summation sign, the symbol "*" represents multiplication, subscript $i=0, 1, 2, \ldots, 3^n-1$, i is expressed in ternary form as $i_{n-1} i_{n-2} \ldots i_0$, $a_i$ is a coefficient of FPRM expansion, $a_i \in \{0, 1, 2\}$; $\Pi$ represents a modulo-3 multiplication operation, $$\prod_{j=0}^{n-1} \dot{x}_j^{i_j}$$

has its expansion as follow:

$$\prod_{j=0}^{n-1} \dot{x}_j^{i_j} = \dot{x}_{n-1}^{i_{n-1}} \dot{x}_{n-2}^{i_{n-2}} \ldots \dot{x}_0^{i_0},$$

where $i_j \in \{0, 1, 2\}$, $\dot{x}_j = (x_j \oplus p_j)$, $\dot{x}_j^0 = 1 = \dot{x}_j^1 = \dot{x}_j$, $\dot{x}_j^2 = \dot{x}_j * \dot{x}_j$, polarity p and subscript i determine the representation of the variable $\dot{x}_j$;

1.2) the ternary FPRM logic function under polarity p is composed of two types of multi-input operations which are a multi-input modulo-3 addition operation and a multi-input modulo-3 multiplication operation respectively; based on expansion of a ternary FPRM logic function, the ternary FPRM logic function is decomposed into several multi-input modulo-3 addition operations and several multi-input modulo-3 multiplication operations, then each multi-input operation is individually decomposed into 2-input operations, to obtain 2-input modulo-3 addition operations and 2-input modulo-3 multiplication operations; wherein, the decomposition process is as follows:

a 1st and a 2nd input variables of a multi-input operation are taken as two input variables of a first 2-input operation, to obtain an output variable of the first 2-input operation; the output variable of the first 2-input operation and the 3rd input variable of the multi-input operation are taken as two input variables of a second 2-input operation, to obtain an output variable of the second 2-input operation; the output variable of the second 2-input operation and the 4th input variable of the multi-input operation are taken as two input variables of a third 2-input operation, to obtain an output variable of the third 2-input operation; and so forth, till all the input variables of the multi-input operation have been taken as an input variable of a 2-input operation, thereby accomplishing the decomposition of the multi-input operation;

the ternary FPRM logic function under polarity p is decomposed into several multi-input modulo-3 addition operations (also referred to as multi-input modulo-3 addition gates) and several multi-input modulo-3 multiplication operations (also referred to as multi-input modulo-3 multiplication gates), then represent N to denote the number of the multi-input modulo-3 addition gates resulted from the decomposition of the ternary FPRM logic function under polarity p, and represent W to denote the number of the multi-input modulo-3 multiplication gates resulted from the decomposition of the ternary FPRM logic function under polarity p; each multi-input modulo-3 addition operation is decomposed into several 2-input modulo-3 addition operations (also referred to as 2-input modulo-3 addition gates), and each multi-input modulo-3 multiplication operation is decomposed into several 2-input modulo-3 multiplication operations (also referred to as 2-input modulo-3 multiplication gates); the number of the 2-input modulo-3 addition gates resulted from the decomposition of the hth multi-input modulo-3 addition gate is denoted as $No_h\_of\_Mod\ 3\text{-}A_p$, $h=1, 2, \ldots, N$; the number of the 2-input modulo-3 multiplication gates resulted from the decomposition of the wth multi-input modulo-3 multiplication gate is denoted as $No_w\_of\_Mod\ 3\text{-}M_p$, $w=1, 2, \ldots, W$;

represent $$S = \sum_{h=1}^{N} \text{No}_{h}\bullet\_\text{of}\_\text{Mod3} - A_p + \sum_{w=1}^{W} \text{No}_{w}\bullet\_\text{of}\_\text{Mod3} - M_p \qquad (5)$$

be an area estimation model of the ternary FPRM circuit, where S represents the area;

$$\sum_{h=1}^{N} \text{No}_{h}\bullet\_\text{of}\_\text{Mod3} - A_p$$

represents the total number of 2-input modulo-3 addition gates resulted from the decomposition of the ternary FPRM logic function under polarity p;

$$\sum_{w=1}^{W} \text{No}_{w}\bullet\_\text{of}\_\text{Mod3} - M_p$$

represents the total number of 2-input modulo-3 multiplication gates resulted from the decomposition of the ternary FPRM logic function under polarity p;

2) establishing a corresponding relationship between the ternary FPRM circuit and population migration algorithm:

population migration algorithm includes the following key factors: population location, attraction of population location, the greatest attractive site, the greatest attraction, ground space of population mobility, concession region, population mobility, population migration and population disperse; the area optimization of the ternary FPRM circuit includes the following key factors: polarity, area size corresponding to polarity, optimal polarity, minimum area, optional polarity space, the zone where the optimal polarity exists, polarity jump to the zone where the optimal polarity exists and jump out of the local optimal polarity;

the population location is mapped to area optimization of the ternary FPRM circuit, and represented as polarity; the attraction of the population location is mapped to area optimization of the ternary FPRM circuit, and represented as the area size corresponding to the polarity; the greatest attractive site is mapped to area optimization of the ternary FPRM circuit, and represented as the optimal polarity; the greatest attraction is mapped to area optimization of the ternary FPRM circuit, and represented as the minimum area; the ground space of population mobility is mapped to area optimization of the ternary FPRM circuit, and represented as an optional polarity space; the concession region is mapped to area optimization of the ternary FPRM circuit, and represented as the zone where the optimal polarity exists; the population mobility is mapped to area optimization of the ternary FPRM circuit, and represented as polarity transition; the population migration is mapped to area optimization of the ternary FPRM circuit, and represented as polarity jump to the zone where the optimal polarity exists; the population disperse is mapped to area optimization of the ternary FPRM circuit, and represented as polarity jump out of the local optimal polarity;

3) setting an attraction function for calculating the attraction of the population location in population migration algorithm:

according to the area estimation model, an attraction function for calculating the attraction of the population location in population migration algorithm is set as follows: in population migration algorithm, greater attraction indicates higher economic level of the population location, whereas the area-optimal polarity requires the area to be as small as possible, and therefore, in order to combine both conditions, the reciprocal of the area is employed to represent the attraction, and the attraction function is obtained as follows:

$$\text{attraction} = (1/S) * \alpha = \qquad (2)$$
$$\left(1 \middle/ \left(\sum_{h=1}^{N} \text{No}_{h}\bullet\_\text{of}\_\text{Mod3} - A_p + \sum_{w=1}^{W} \text{No}_{w}\bullet\_\text{of}\_\text{Mod3} - M_p\right)\right) * \alpha$$

where the symbol "/" denotes a division operation, and attraction represents attraction value, greater attraction value indicates better area optimization effect of the circuit; α is a magnification coefficient, its value is equal to a natural number greater than 1000;

4) setting relevant parameters of population migration algorithm, wherein population migration algorithm has five parameters to be set: population scale s, the number of population mobility times 1, population pressure parameter q, shrinkage factor c, and the number of population disperse times z;

represent the population scale s be equal to the number of input variables of the ternary FPRM logic function, i.e., s=n; the number of population mobility times 1 is the radius of the region where the population exists, and the radius where the population exists is denoted as Δt, l=Δt, Δt=$3^s/s^2$; the population pressure parameter q is Δt/10; the shrinkage factor c=0.3; when the ternary FPRM circuit is a small-scale circuit, the number of population disperse times z=15, and when the ternary FPRM circuit is a large-scale circuit, the number of population disperse times z=2; and 5) employing population migration algorithm to calculate and obtain the greatest attractive site and the greatest attraction, wherein the greatest attractive site is the optimal polarity of the ternary FPRM circuit, and the greatest attraction is the minimum area of the ternary FPRM circuit.

2. The method of claim 1, wherein in the step 5), the calculation process of population migration algorithm is as follows:

5.1) in the ground space of population mobility, a random function rand( ) is employed to generate population locations in number S, and the population locations in number S are denoted as P1, P2, . . . , Ps, then the P1, P2, . . . , Ps are taken as center points respectively, so that the regions in number S where the population exists are determined, according to the radiuses of the regions where the population exists;

5.2) the attraction function is used to calculate the attraction of the population location Pv, v=1, 2, 3, . . . , s, to obtain the attraction of the population locations P1, P2, . . . , Ps;

5.3) by comparing the attraction of the population locations P1, P2, . . . , Ps, the population location with the greatest attraction is selected as the greatest attractive site, then the greatest attractive site and the greatest attraction are recorded;

5.4) population mobility is performed: in the population region corresponding to the population location Pv, a random function is employed to randomly generate a population location P'v, to obtain P'1, P'2, ..., P's then P'1, P'2, ..., P's is used to update the population locations P1, P2, ..., Ps, namely P1=P'1, P2=P'2, ..., Ps=P's, where P'v=2*Δt*rand( )+(Pv−Δt), the symbol "*" denotes multiplication operation, Δt denotes the radius of the population region; rand( ) is the random function;

5.5) the updated population locations P1, P2, ..., Ps in the step 5)-4 are processed by following the steps 5.2) 5.3), to obtain the updated greatest attractive site and the updated greatest attraction;

5.6) population migration is performed: the updated greatest attractive site in step 5.5) is taken as the center point, so that the concession region is determined according to the radius Δt of the population region, then a random function rand( ) employed to generate population locations in number S in the concession region, so that the obtained population locations in number S are used to again update the population locations P1, P2, ..., Ps;

5.7) the updated population locations P1, P2, ..., Ps in the step 5.6) are processed by following the steps 5.2) 5.3), to obtain the again updated greatest attractive site and the again updated greatest attraction;

5.8) shrinkage of the concession region is performed: Represent Δt'=(1−c)*Δt and employ Δt' to update Δt, the steps 5.6) 5.7) are repeated until Δt<q;

5.9) after the concession region is shrunk to a certain extent that Δt<q, population disperse is performed: the steps 5.1) 5.8) are repeated, until the number of population disperse times z is met, and so the algorithm ends, to obtain the last updated greatest attractive site and the last updated greatest attraction;

5.10) the last updated greatest attractive site and the last updated greatest attraction are output, wherein the greatest attractive site is the optimal polarity of the ternary FPRM circuit, and the greatest attraction is the minimum area of the ternary FPRM circuit.

3. The method of claim 1, wherein in the step 1), a ternary-FPRM-polarity transform technology is employed to obtain the ternary FPRM logic function, and the specific process is as follows:

A) the required polarity of the ternary FPRM circuit is denoted as p, and p is expressed in ternary form as $p=p_{n-1} p_{n-2} \cdots p_0$, where n represents the number of the input variables;

B) for $p_j$, its corresponding fixed-polarity GF transformation matrix $G_3^{\langle p_j \rangle}$ is generated; where, $$p_j \in \{p_{n-1}, p_{n-2}, \ldots, p_0\}, j \in \{n-1, n-2, \ldots, 0\}; \text{ when } p_j = 0,$$

$$G_3^{\langle p_j \rangle} = G_3; \text{ when } p_j = 1, G_3^{\langle p_j \rangle} = G_3^{\langle 1 \rangle}; \text{ when } p_j = 2, G_3^{\langle p_j \rangle} = G_3^{\langle 2 \rangle};$$

$$G_3 = \begin{bmatrix} 1 & 0 & 0 \\ 0 & 2 & 1 \\ 2 & 2 & 2 \end{bmatrix}, G_3^{\langle 1 \rangle} = \begin{bmatrix} 0 & 0 & 1 \\ 2 & 1 & 0 \\ 2 & 2 & 2 \end{bmatrix}, G_3^{\langle 2 \rangle} = \begin{bmatrix} 0 & 1 & 0 \\ 1 & 0 & 2 \\ 2 & 2 & 2 \end{bmatrix};$$

C) the minterm M is expressed in ternary form as a sequence $M=M_{n-1} M_{n-2} \ldots M_0$, $M_j \in \{0, 1, 2\}$, and its corresponding function value is denoted as $f(M)$;

D) according to the formula (3), for each minterm, a new term $\pi_j$ is generated, $\pi_j \in \{0, 1, 2\}$; according to the formula (4), the contribution of the new item to the FPRM coefficients is calculated, and the contribution value is denoted as $v(\pi)$;

$$\pi_j = \{t | G_3^{\langle p_j \rangle}[t, M_j] \neq 0\}, t \in \{0, 1, 2\} \quad (3)$$

$$v(\pi) = (v_{n-1} \cdot v_{n-2} \cdots v_0) \cdot f(M) \quad (4)$$

where $\pi = \pi_{n-1} \pi_{n-2} \cdots \pi_0$, $v_j = G_3^{\langle p_j \rangle}[\pi_j, M_j]$;

E) an index table is employed to record the generated new term and the contribution value of each new tem, if the generated new term already exists, then the contribution values of the identical new items are superimposed and presented as the contribution value of that new item;

F) the steps 3)-4) are repeated for all the minterms, and the contribution values corresponding to respective new terms are the FPRM expansion coefficients; and G) according to the FPRM expansion coefficients, the ternary FPRM logic function expression under polarity p is obtained.

* * * * *